United States Patent [19]

Donner

[11] 4,439,825
[45] Mar. 27, 1984

[54] POSITION REGULATION SYSTEM CONTAINING A DIGITAL INCREMENTAL MEASURING APPARATUS

[75] Inventor: Meinrad Donner, Nuolen, Switzerland

[73] Assignee: Maag Gear-Wheel & Machine Company Limited, Zürich, Switzerland

[21] Appl. No.: 286,777

[22] Filed: Jul. 27, 1981

[30] Foreign Application Priority Data

Aug. 17, 1980 [CH] Switzerland ................. 6201/80

[51] Int. Cl.³ .................................... G05B 19/21
[52] U.S. Cl. .................... 364/167; 318/603; 364/174; 364/183
[58] Field of Search .................. 364/167–175, 364/183, 474, 475, 560, 561; 377/2, 16, 17; 318/560, 567, 569, 600–605, 608, 660, 661

[56] References Cited

U.S. PATENT DOCUMENTS

| | | | |
|---|---|---|---|
| 3,969,615 | 7/1976 | Bowers et al. | 364/174 X |
| 4,021,650 | 5/1977 | Ruble | 364/167 |
| 4,123,750 | 10/1978 | Leney et al. | 364/167 X |
| 4,272,818 | 6/1981 | McDaniel | 364/167 |
| 4,342,077 | 7/1982 | Passey et al. | 364/167 |

OTHER PUBLICATIONS

Sloan et al.–"Computerized Manipulator Position Sensing"–IBM Technical Disclosure Bulletin–vol. 21, No. 3, Aug. 1978–pp. 913-914.

*Primary Examiner*—Joseph F. Ruggiero
*Attorney, Agent, or Firm*—Werner W. Kleeman

[57] ABSTRACT

A position regulation system containing a digital incremental measuring apparatus. The use of a discriminator and a computer allows the detection of long distances with high resolution, without counters or with only very short counters. The system is capable of automatically advancing to certain positions at a preselected speed or with preselected acceleration and of accordingly determining priorities for the positioning or adjustment magnitudes used for the advance.

4 Claims, 3 Drawing Figures

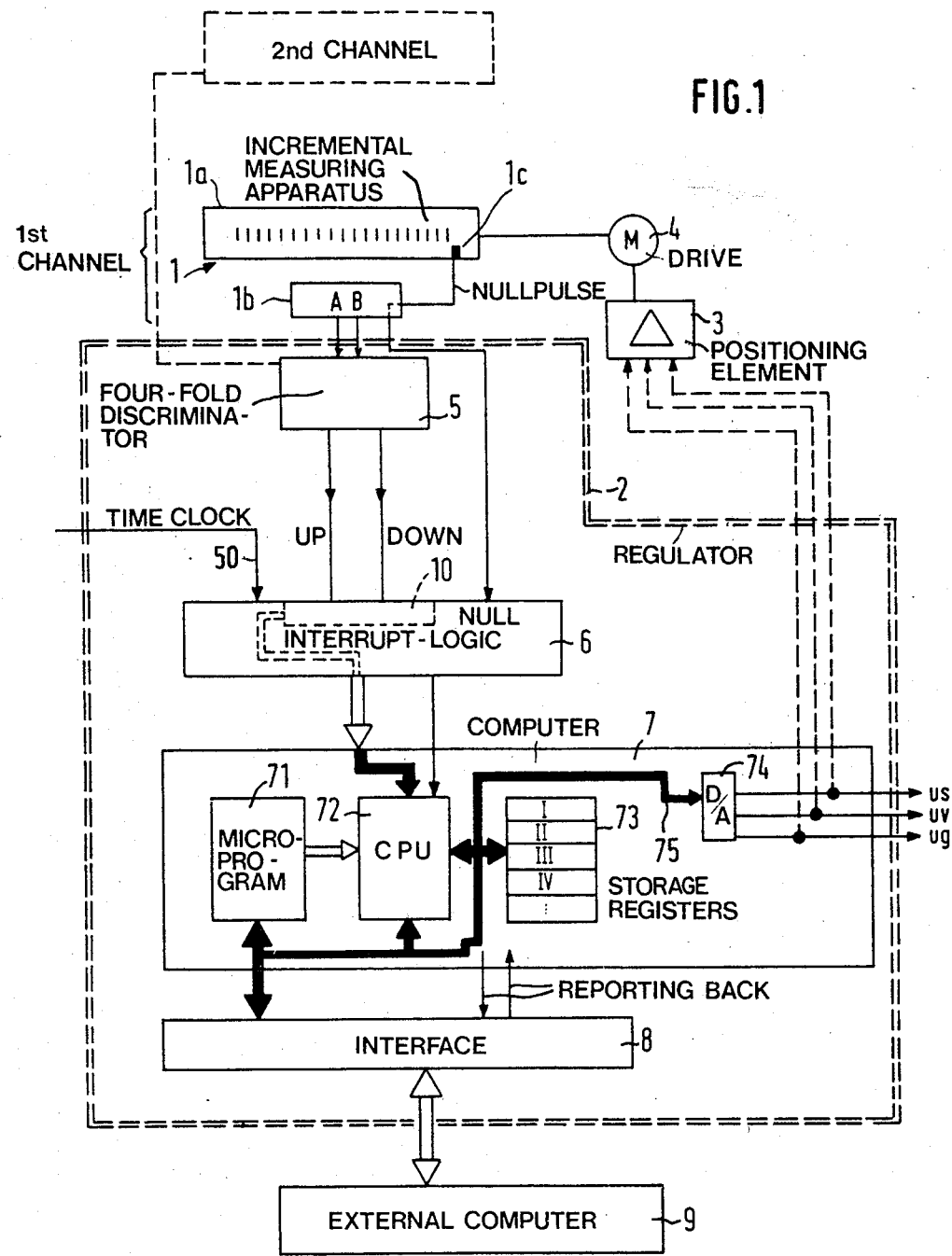

POSITION REGULATION SYSTEM CONTAINING A DIGITAL INCREMENTAL MEASURING APPARATUS

BACKGROUND OF THE INVENTION

The present invention relates to a new and improved position regulation system.

Generally speaking, the position regulation system of the present invention is of the type comprising a digital incremental measuring apparatus with a direction discriminator for the evaluation of measuring signals having 90° phase shift. Such system contains two relatively movable objects, one of which is provided with a drive.

From German Pat. No. 2,758,525, published June 28, 1979, there is known to the art a digital incremental measuring apparatus with a direction discriminator, which serves to determine the relative position of two objects displaceable relative to one another. Since the resolution capacity of such measuring apparatuses is limited by the grid constant of the employed precision scale and by the counting frequency of the counters, the speed of advance of the relatively movable objects is increased so as to avoid a high resolution scale graduation. In order to achieve this, an up-down or forwards-backwards counter with a direction discriminator is used, which counts the signals which have a 90° phase shift and are supplied by a scanning head sensing the scale graduation. Such signals are counted according to the principle of single evaluation, i.e. only the edge of the pulse corresponding to a change of the 90°-signal is counted, whereas the 0°-signal has the value 1. Then a division into any number of coded intermediate values is carried out by means of a circuit whose internal structure is not disclosed in the aforementioned patent. Thus, the graduation scale can be coarser in production to the factor by which the number of intermediate values is larger than the number of the measuring signals.

Such measuring apparatus is not suitable for a position regulation system containing two objects which are displaceable relative to one another and one of which objects has an incremental scale with a very fine graduation, such as 10 μm, since the required high resolution of the measuring apparatus and the great length of the incremental scale would require counters with high capacity and a great circuit complexity.

SUMMARY OF THE INVENTION

Therefore, it is a primary object of the present invention to provide a new and improved arrangement of a position regulation system containing a digital incremental measuring apparatus with a direction discriminator, which does not require high-capacity counters and high circuit complexity even with high resolution and great length of the incremental scale used.

Now in order to implement this object and others which will become more readily apparent as the description proceeds, the position regulation system of the present development is manifested by the features that the discriminator delivers a number of measuring pulses for each relative direction of movement of both objects, wherein each of such measuring pulses corresponds to one pulse edge of the measuring signals. The output of the discriminator is connected in circuit with an interrupt logic which is connected to a computer having a program and memory register means. The course of the program is interrupted by each output pulse of the interrupt logic, and the output pulses from the interrupt logic serve for updating an actual value in the memory register means. These output pulses, following the interruption of the program of the computer, forming a set value/actual value difference and from such difference a positioning magnitude which is transmitted to a positioning element controlling the drive of the driven object.

According to the invention, the position regulation system therefore is not provided with a measuring apparatus containing a direction discriminator which operates according to the principle of single evaluation, but rather with a discriminator which via an interrupt logic feeds a computer. On the basis of a comparison between the set value and the actual value, such computer delivers the positioning or adjustment magnitude for a positioning or adjustment element connected with the drive. Thus, the position regulation system can be used, for instance, for a gear grinder at which the incremental scale has a graduation of only 10 μm, which leads to a high number of measuring signal pulses at the output of the scanning head. This number is still doubled by the discriminator which, depending on the direction of motion, i.e. up or down on the scale, delivers four measuring pulses for every increment of the scale. Since each measuring pulse corresponds to a covered distance, the measuring pulses of each direction of motion need to be added or subtracted. For the position regulation system according to the invention no counters or only short counters are needed for detecting long distances with a high resolution, since the pulses are simply stored in memory or storage registers, the content of which then corresponds to the covered distance, i.e. the actual value of the position.

According to a further aspect of the invention the computer can be constructed to contain at its output side a digital to analogue converter (D/A-converter) which delivers the positioning magnitude for the position. The computer furnishes the positioning or adjustment magnitude in the form of an analogue value which can be directly processed by the normally used analogue positioning or adjustment elements.

As a further feature of the invention the interrupt logic can possess a time clock input, by means of which there likewise can be interrupted the course of the program in the computer. The measuring pulses arriving at the interrupt logic between such interruptions constitute a measurement for the displacement speed of the driven object, and a signal representative of the displacement speed of the object is transmitted to the digital to analogue converter as a second positioning magnitude. This second positioning magnitude constitutes a measure for the displacement speed of the driven object. Moreover, there can be provided an apparatus or means for differentiating the displacement speed of the driven object. Such differentiating means deliver as a third positioning magnitude the acceleration of the object. Both of these positioning or adjustment magnitudes enable the regulation system to advance to positions at a preselected speed or with preselected acceleration.

Still a further design of the position regulation system contemplates arranging an intermediate storage or memory between the discriminator and the interrupt logic. This intermediate storage or memory stores measuring pulses arriving during the time clock interruptions and the interrupt logic processes such measuring pulses. There is thus prevented the loss of any of the incoming measuring pulses during such time clock interruptions.

Also, there can be provided an external computer which determines priorities between the three positioning magnitudes. Hence, it is possible, for instance, for processing reasons, to give priority either to the positioning magnitude for the displacement speed, since at a gear grinding machine there is desirable, for example, a quick advance for the roughing work while the exact position is not important, or to the positioning magnitude for the position, since for the finishing work the exact position is important.

BRIEF DESCRIPTION OF THE DRAWINGS

The invention will be better understood and objects other than those set forth above will become apparent when consideration is given to the following detailed description thereof. Such description makes reference to the annexed drawings which depict an exemplary embodiment of the invention described hereinafter in greater detail and wherein:

FIG. 1 is a block circuit diagram of the position regulation system according to the invention.

DETAILED DESCRIPTION OF THE PREFERRED EMBODIMENTS

Figure 2A:
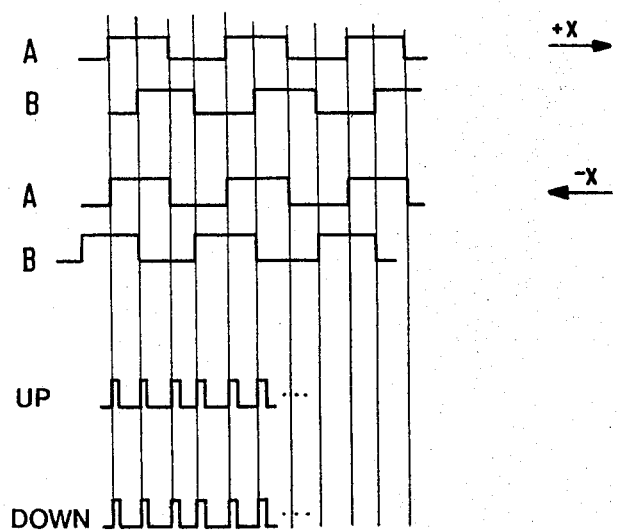
FIG. 2a and FIG. 2b are respective diagrams illustrating the mode of operation of a discriminator.

FIG. 1 shows a block circuit diagram of a position regulation system wherein the incremental measuring apparatus for measuring the actual value is designated in its entirety by reference character 1, the regulator or control in its entirety by reference character 2, a positioning or adjustment element by reference character 3 and a drive by reference character 4. The incremental measuring apparatus contains an incremental scale 1a, e.g. a precision scale which can have a graduation of 10 μm at a gear grinding machine. However, the position regulation device described herein is not limited to such machines or to machine tools in general, but may be applied in any case where a high resolution is required for long travel or displacement paths of objects to be moved. The incremental scale 1a is attached to a carriage or slide which is driven by drive 4. Arranged opposite the incremental scale 1a is a scanning or sensing head 1b which scans the graduation marks of the scale and delivers for every graduation marking or line two measuring signals A and B (FIG. 2) which have a phase shift of 90°. In one direction of motion of the object to be moved, indicated by +x in FIGS. 2a and 2b, the measuring signal A leads the measuring signal B by 90°, while in the opposite direction, indicated by −x in FIGS. 2a and 2b, the measuring signal B leads the measuring signal A by 90°.

The scanning or sensing head 1b is provided with two outputs, by means of which the measuring signals A and B are transmitted to a discriminator 5.

Figure 2B:
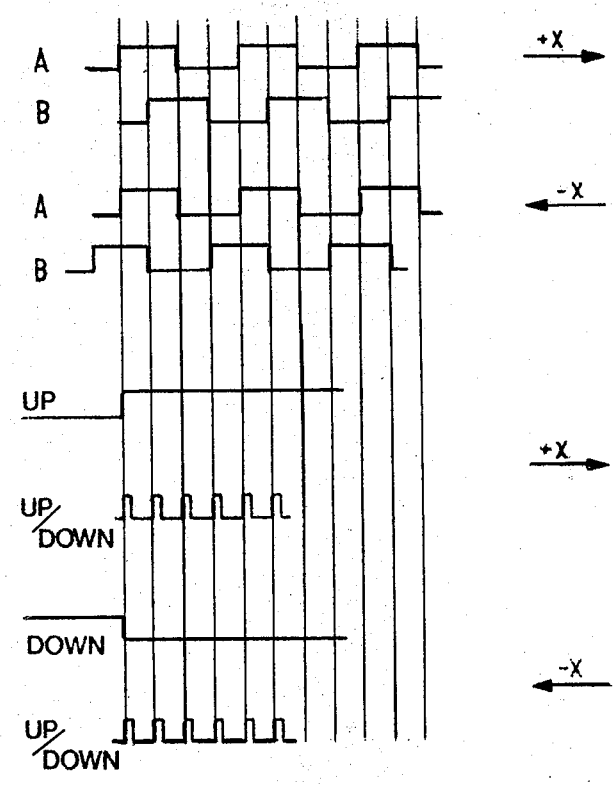

The discriminator 5 doubles the pulses of the two measuring signals A, B by generating a defined measuring pulse for every ascending and descending pulse edge or flank of the signals A and B, whereby separate pulses are generated for each direction of motion or there are generated non-separated movement pulses UP/DOWN and separate direction pulses UP, DOWN. In FIGS. 2a and 2b the measuring pulses for the direction of motion +x, i.e. in upward direction of the incremental scale 1a with reference to a zero-mark or graduation line 1c, are designated by UP, while for the direction of motion −x, i.e. downwards with reference to the zero-mark or graduation line 1c, they are designated by DOWN, or UP/DOWN and UP and DOWN respectively.

The discriminator 5 transmits these measuring pulses to an interrupt logic 6 via separate channels which are designated by UP or DOWN, or by UP/DOWN and UP and DOWN respectively. The interrupt logic 6 is connected to a computer designated in its entirety by reference character 7.

The computer 7 comprises a microprogram 71 which can be exchanged, when necessary, a central processing unit CPU 72, a memory or storage register 73 and, if necessary, a digital to analogue converter 74. Furthermore, such computer 7 comprises data busses 75. The measuring pulses UP, DOWN need to be added to subtracted in order to determine the actual positional value reached, since every pulse corresponds to a certain distance covered or displacement path. For this purpose the measuring pulses trigger by means of the interrupt logic 6 an interruption of the computer program running in the computer 7, according to the direction of motion, i.e. +x or −x. A memory or storage in the storage or memory registers 73, for instance memory or storage I, is incremented or decremented, so that the content of the memory or storage I corresponds to the distance covered. The memory can therefore be regarded as a software-counter for the actual value. As occasion demands, i.e. according to the number of pulses to be counted, several storages or memories I, II, III . . . can be interconnected with each other by means of the microprogram 71 so that appreciable "counter lengths" can be achieved.

The positional set or reference point is stored in the storage or memory register 73, for instance in the storage or memory IV, where it has been loaded through an interface 8 which is connected to the computer 7. Whenever there is no interruption in the computer 7 by entering UP or DOWN measuring pulses, the set point/actual value difference is determined under the control of the microprogram 71 and transmitted to the digital to analog converter 74. Such converter 74 delivers an analogue signal us which constitutes the positioning magnitude and such is transmitted to the positioning element 3 in order to adjust the object to the exact position by means of the drive 4. In addition to the measuring pulses, the interrupt logic 6 receives a null pulse, which determines the location of the scanning head 1b with reference to the incremental scale 1a.

The interrupt logic 6 is further provided with a time clock input 50 connected to a here not further illustrated but conventional clock generator and serving for time clock interruptions in periodical intervals. Thus, the speed of movement of the scale can be determined by means of the displacement paths stored in the memory register 73 and the differences of such displacement paths since the last time clock interruption, or the acceleration of the scale can be determined by means of a differentiator included, for instance, in the microprogram 71. In the digital to analogue converter 74 the values for speed and acceleration are converted into analogue signals uv and ug, respectively. By means of such signals the positioning element 3 can be controlled so as to advance the object to a given position at a certain speed or with a certain acceleration, as the case may be.

By means of the interface 8 the program of computer 7 can be exchanged by means of an external computer 9.

Therefore, if necessary, other program parts or programs can be fed into the microprogram storage 71 which have other or additional functions, e.g. regulation or control algorithms. Furthermore, the memory content of computer 7 can be displayed through the interface 8 and the external computer 9. Through the interface 8 and the external computer 9 it is furthermore possible to achieve a synchronization with external processes by means of feedback or reporting back messages, such as, for instance, position has been reached, or, speed has been reached.

The regulator 2 offers the possibility of detecting and controlling a plurality of independent movements. For this purpose it is only necessary to provide for an appropriate number of additional channels, each of which contain an incremental measuring apparatus, a drive and a positioning element, and to connect them to the discriminator 5, as indicated by broken lines for a second channel in FIG. 1.

As mentioned, the digital to analog converter 74 can be omitted if the positioning element or the evaluation circuits receiving the positioning magnitude can process the latter in digital form.

If so desired, the interrupt logic 6 can be provided with an intermediate memory or storage 10 which during time clock interruptions stores measuring pulses coming from the discriminator 5 so that these do not get lost.

The external computer 9 can be used for determining priorities among the three positioning magnitudes. This can be desirable, for instance, for the machining of workpieces, since for the roughing work a quick advance is needed while the position is not important and priority is therefore given to the positioning magnitude uv over the positioning magnitude us, whereas for the finishing work priority would be given to the positioning magnitude us over the positioning magnitude uv.

While there are shown and described present preferred embodiments of the invention, it is to be distinctly understood that the invention is not limited thereto, but may be otherwise variously embodied and practiced within the scope of the following claims. Accordingly,

What I claim is:

1. A position regulation system for two relatively movable objects, one of which is provided with a drive, comprising:
   a digital incremental measuring apparatus for evaluation of measuring signals of 90°-phase shift;
   said digital incremental measuring apparatus containing a direction discriminator having an output;
   said discriminator delivering a number of measuring pulses for each relative direction of movement of said two objects;
   each of said measuring pulses corresponding to one edge of the measuring signals;
   an interrupt logic for delivering output pulses;
   the output of said discriminator being connected to said interrupt logic;
   a computer having a program and memory register means;
   said interrupt logic being connected to said computer;
   the course of the program of said computer being interrupted by each output pulse of said interrupt logic;
   said output pulses from said interrupt logic serving for updating an actual value in said memory register means;
   said output pulses forming a set value/actual value difference following the interruption of the program of the computer;
   said output pulses forming from said set value/actual value difference a positioning magnitude;
   a positioning element;
   said positioning magnitude being transmitted to said positioning element;
   said positioning element controlling the drive of the one object;
   the computer has an output side;
   said computer contains a digital to analogue converter defining said output side of said computer;
   said digital to analogue converter delivering said positioning magnitude which defines a positioning magnitude for the position of said one object;
   said interrupt logic being provided with a time clock input;
   said time clock input interrupting the course of the program in said computer;
   the measuring pulses arriving at said interrupt logic between said interruptions being a measurement for the displacement speed of the driven object; and
   a signal representative of the displacement speed of said object being transmitted to the digital to analogue converter as a second positioning magnitude.

2. The system as defined in claim 1, further comprising:
   means for differentiating the displacement speed of the driven object; and
   said means delivering as a third positioning magnitude the acceleration of the object.

3. The system as defined in claims 1 or 2, further including:
   an intermediate memory arranged between said discriminator and said interrupt logic;
   said intermediate memory storing measuring pulses arriving during time clock interruptions; and
   said interrupt logic processing said measuring pulses.

4. The system as defined in claim 2, further comprising:
   an external computer means for determining priorities between the three positioning magnitudes.

* * * * *